(12) United States Patent
Shorter

(10) Patent No.: US 6,687,707 B1
(45) Date of Patent: Feb. 3, 2004

(54) UNIQUE OBJECT IDENTIFICATION IN A NETWORK OF COMPUTING SYSTEMS

(75) Inventor: David Uel Shorter, Lewisville, TX (US)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 08/980,336

(22) Filed: Nov. 28, 1997

(51) Int. Cl.⁷ .............................. G06F 17/00; G06F 7/00
(52) U.S. Cl. ....................... 707/103 R; 707/10; 709/245
(58) Field of Search ........................ 707/10, 104, 100, 707/103; 709/217, 218, 245, 303

(56) References Cited

U.S. PATENT DOCUMENTS

| | | | |
|---|---|---|---|
| 4,718,005 A | | 1/1988 | Feigenbaum et al. .. 395/200.52 |
| 5,325,524 A | * | 6/1994 | Black et al. ................... 707/10 |
| 5,388,213 A | | 2/1995 | Oppenheimer et al. 395/200.75 |
| 5,430,719 A | | 7/1995 | Weisser, Jr. et al. ......... 370/389 |
| 5,434,974 A | * | 7/1995 | Loucks et al. ............... 707/101 |
| 5,522,077 A | | 5/1996 | Cuthbert et al. ............. 395/683 |
| 5,550,981 A | | 8/1996 | Bauer et al. ............. 395/200.5 |
| 5,581,765 A | | 12/1996 | Munroe et al. ............. 395/677 |
| 5,884,322 A | * | 3/1999 | Sidhu et al. ................. 707/200 |

* cited by examiner

Primary Examiner—John Breene
Assistant Examiner—Luke S Wassum
(74) Attorney, Agent, or Firm—Richard A. Tomlin; Bracewell & Patterson, L.L.P.

(57) ABSTRACT

Each network of data processing systems within a system of networks is assigned a unique network identifier when connected to the system. Each data processing system within a given network is assigned a unique host system identifier when the data processing system is added to the network. When a new object is added to a given data processing system, a unique object identifier is constructed with three fields, including a high order field containing the network identifier for the network in which the object is being added, a next order field containing a host system identifier for the data processing system to which the object is being added, and an object identifier unique for all objects within the host data processing system. The combination of the three identifiers results in a single, unique object identifier which is unique for all objects across the system of networks and data processing systems. The host data processing system need not be connected to any other data processing system or network at the time the object is added to guarantee that the object identifier is unique across the entire system of networks. Therefore, the object may be added to a database of objects distributed among a plurality of data processing systems and accessed by an application communicating, when bandwidth is available, with other data processing systems over the Internet.

14 Claims, 12 Drawing Sheets

| Combination name | Attribute name list |
|---|---|
| NAME | NAME<br>NAME<br>NAME |
| NAME | NAME |
| ⋮ | ⋮ |
| NAME | NAME<br>NAME |

514

| Attribute name | Match weight | Non-match weight | Post-rule weight | Rule name |
|---|---|---|---|---|
| NAME | VALUE | VALUE | VALUE | NAME |
| NAME | VALUE | VALUE | VALUE | NAME |
| ... | ... | ... | ... | ... |
| NAME | VALUE | VALUE | VALUE | NAME |

Fig. 5A

UNIQUE OBJECT IDENTIFICATION IN A NETWORK OF COMPUTING SYSTEMS

RELATED APPLICATIONS

The present invention is related to the subject matter of the following commonly assigned, copending U.S. patent application Ser. No. 08/980,355 entitled "Method of Determining the Unique ID of an Object Through Analysis of Attributes Related to the Object" and filed Nov. 28, 1997; and Ser. No. 08/980,334 entitled "Method of Determining the Unique ID of an Object in a Peer to Peer Configuration of Object Indexes" and filed Nov. 28, 1997. The content of the above-referenced applications is incorporated herein by reference.

BACKGROUND OF THE INVENTION

1. Technical Field

The present invention relates in general to object identification and in particular to identification of objects distributed among a plurality of data processing systems and/or data processing system networks. Still more particularly, the present invention relates to unique identification of objects within a data processing system which forms a portion of a database of objects distributed among a plurality of data processing systems and/or data processing system networks without requiring the host data processing system to be connected to any other data processing system at the time the object identifier is assigned.

2. Description of the Related Art

Objects frequently require an identification which is unique, as in cases where the object forms a portion of a database of objects. Various solutions exist to provide unique object identifiers within a single data processing system whenever an object is added to the data processing system. A common solution is to utilize a central registry to assign a numerical identifier to a new object from a sequential set of numbers under the control management of the central registry. When an object identifier for a new object is requested, the central registry increments the last number assigned to an object and provides the result as a unique number satisfying the request.

In certain situations, an object must have an identification which is unique within a plurality or network of data processing systems, as in cases where the object forms a portion of a database of objects distributed among the plurality of data processing systems. The object identifier must be unique when the corresponding object is added to one of the data processing systems within the network. In such circumstances, the solution of a central registry requires that the data processing system to which the object is being added be connected to the central registry at the time the object is added. This requirement may be burdensome, particularly where the objects are distributed among data processing systems communicating over the Internet, where limited bandwidth may preclude connection to the central registry at the time an object must be added.

One alternative is to assign different ranges of object identifiers to different data processing systems in a network or system of networks. When a new object is added to a particular data processing system, the object identifier is selected from the range of identifiers assigned to that data processing system. This method is limited, however, due to the possibilities of exhausting the numbers within a range and exhausting the number of ranges. Sufficient ranges need to be reserved for future additions of data processing systems.

It would be desirable, therefore, to provide a method and apparatus for uniquely identifying an object within a data processing system forming a network which forms, in turn, a system of networks. It would further be desirable for the uniqueness of the object identifier to be guaranteed even if the host data processing system is not connected to any other data processing system at the time the object is added.

SUMMARY OF THE INVENTION

It is therefore one object of the present invention to provide a method and apparatus for object identification.

It is another object of the present invention to provide a method and apparatus for identification of objects distributed among a plurality of data processing systems and/or data processing system networks.

It is yet another object of the present invention to provide a method and apparatus for unique identification of objects within a data processing system which forms a portion of a database of objects distributed among a plurality of data processing systems and/or data processing system networks without requiring the host data processing system to be connected to any other data processing system at the time the object identifier is assigned.

The foregoing objects are achieved as is now described. Each network of data processing systems within a system of networks is assigned a unique network identifier when connected to the system. Each data processing system within a given network is assigned a unique host system identifier when the data processing system is added to the network. When a new object is added to a given data processing system, a unique object identifier is constructed with three fields, including a high order field containing the network identifier for the network in which the object is being added, a next order field containing a host system identifier for the data processing system to which the object is being added, and an object identifier unique for all objects within the host data processing system. The combination of the three identifiers results in a single, unique object identifier which is unique for all objects across the system of networks and data processing systems. The host data processing system need not be connected to any other data processing system or network at the time the object is added to guarantee that the object identifier is unique across the entire system of networks. Therefore, the object may be added to a database of objects distributed among a plurality of data processing systems and accessed by an application communicating, when bandwidth is available, with other data processing systems over the Internet.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is an object identifier for uniquely identifying object within a plurality of data processing system networks in accordance with a preferred embodiment of the present invention;

FIGS. 5A–5E depict an attribute specification table, an input criteria table, and high level flowcharts for a process of determining a unique object identifier through analysis of object attributes in accordance with a preferred embodiment of the present invention.

DETAILED DESCRIPTION OF THE PREFERRED EMBODIMENT

Figure 1:
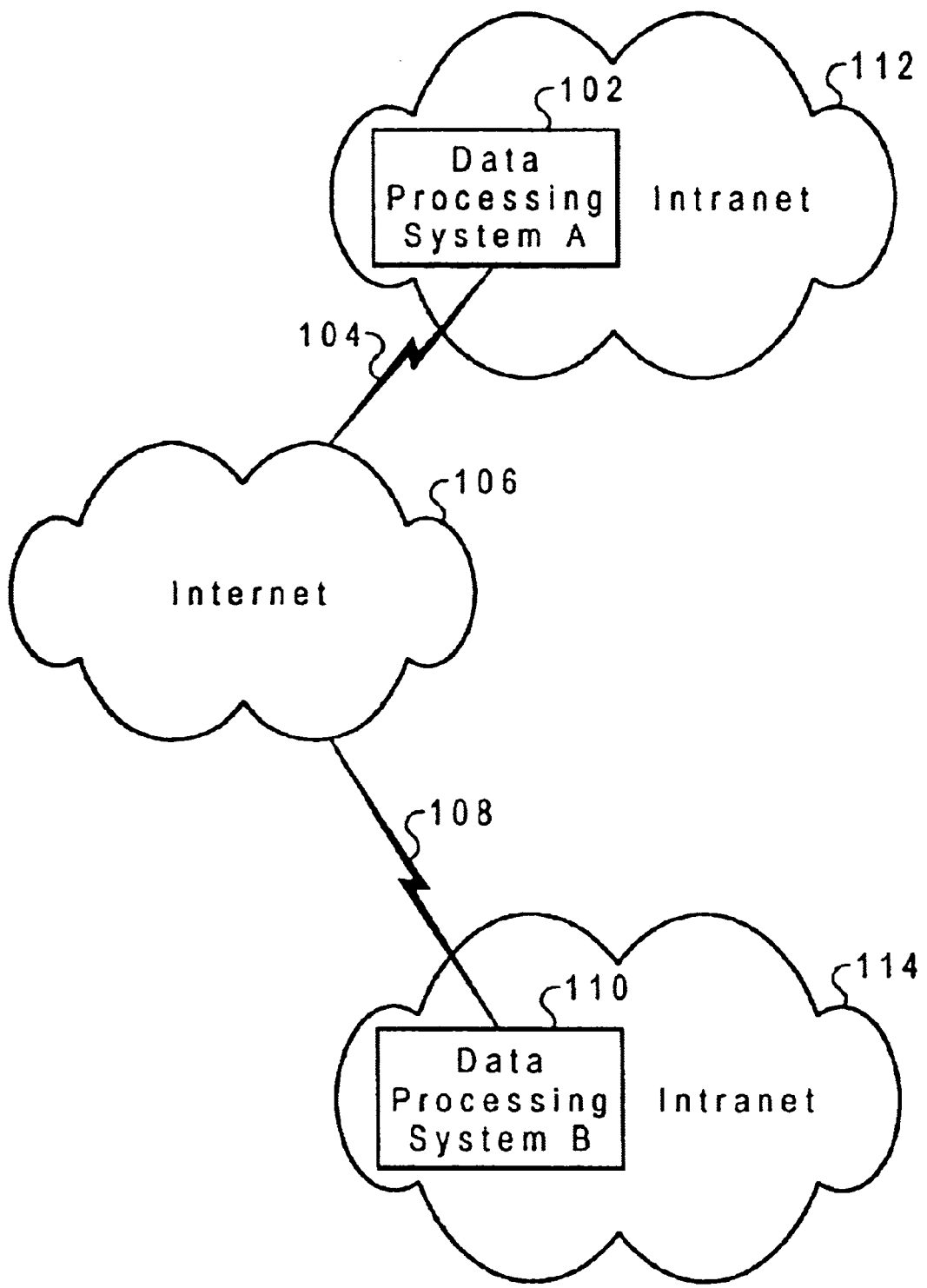
FIG. 1 depicts a network of data processing systems in which a preferred embodiment of the present invention may be implemented.

With reference now to the figures, and in particular with reference to FIG. 1, a network of data processing systems in which a preferred embodiment of the present invention may be implemented is depicted. The exemplary embodiment depicted includes a data processing system 102 connected via communications link 104 to the Internet 106. Communications link 104 may, for example, be in the form of access provided by an Internet service provider (ISP) or via a proxy within a firewall, as is known in the art. Data processing system 102 may include a Java-enabled browser application, allowing data processing system 102 to retrieve and display information formatted in accordance with the HyperText Markup Language (HTML) and to run Java applets, or a Java interpreter, allowing data processing system 102 to execute Java applications.

Also connected to Internet 106, via communications link 108, is data processing system 110. Data processing system 110 may be similar to data processing system 102. As depicted, data processing system 102 may be connected to other data processing systems as part of an intranet 112 while data processing system may be connected to other data processing systems as part of an intranet 114. Intranets 112 and 114 may be local area networks (LANs) in accordance with the known art. Data processing systems 102 and 110 may thus operate collaboratively over Internet 106 as part of a distributed object computing system. Objects, such as Java or JavaScript objects, within data processing systems 102 and 110 may also implement methods and data structures for unique object identification and determining the unique identifier of objects in accordance with a preferred embodiment of the present invention, as described in further detail below.

Figure 2:
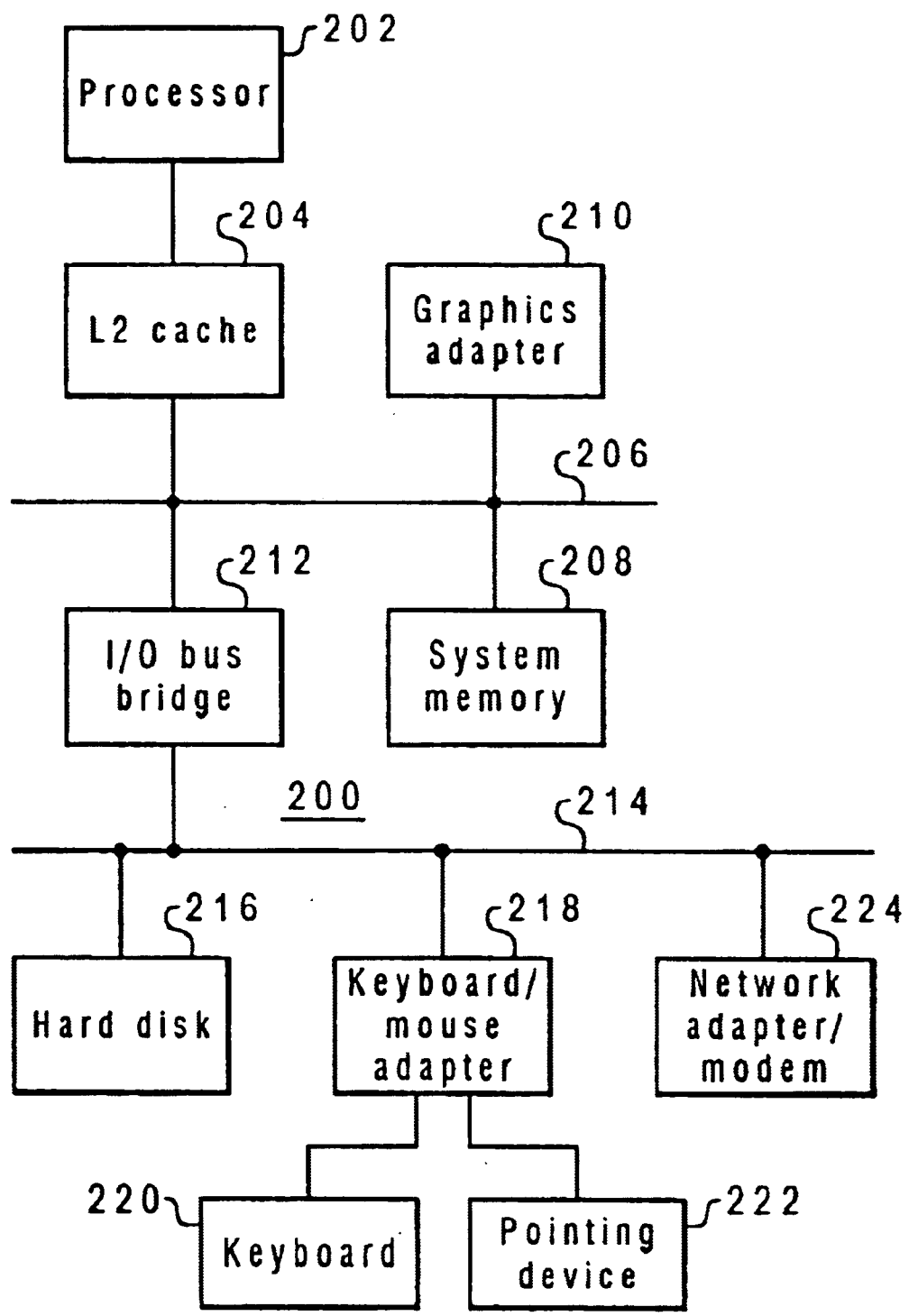
FIG. 2 is a block diagram of a data processing system utilizing unique object identification and methods of determining the unique identifier of objects in accordance with a preferred embodiment of the present invention.

Referring to FIG. 2, a block diagram of a data processing system utilizing unique object identification and methods of determining the unique identifier of objects in accordance with a preferred embodiment of the present invention is depicted. Data processing system 200 may be data processing system 102 or data processing system 110 depicted in FIG. 1. Data processing system 200 in the exemplary embodiment includes a processor 202, which may be a PowerPC™ processor available from International Business Machines Corporation of Armonk, N.Y. Processor 202 is connected to a level two (L2) cache 204, which is utilized to stage data to and from processor 202 at reduced access latency. L2 cache 204 is connected in turn to an interconnect or system bus 206, which is also connected, in the embodiment depicted, to system memory 208 and memory-mapped graphics adapter 210. Graphics adapter 210 provides a connection for a display device (not shown) on which the user interface of software executed within data-processing system 200 is displayed.

Also connected to system bus 206 in the exemplary embodiment is input/output (I/O) bus bridge 212, which provides an interface between system bus 206 and I/O bus 214. A nonvolatile memory such as hard disk drive 216 may be connected to I/O bus 214, as may keyboard/mouse adapter 218, which provides connection to I/O bus 214 for keyboard 220 and pointing device 222. Pointing device 222 may be a mouse, trackball, or the like. Also connected to I/O bus 214 may be network adapter 224 for connecting data processing system 200 to a local area network (LAN), the Internet, or both. Those skilled in the art will appreciate that other devices may be incorporated into data processing system 200, such as an optical disk drive or a modem.

The operation of data processing systems of the type depicted in FIG. 2 is well known in the art. Program information comprising instructions and/or data is stored on nonvolatile memory 216 and may be selectively copied into system memory 208 once data processing system 200 is powered on. Processor 202 executes the instructions within such program information and generates text or graphical information for presentation on display device connected via graphics adapter 210, where the information may be viewed by a user. The user may selectively control operation of data processing system 200 through input entered on keyboard 220 or through pointing device 222. In the present invention, the software implements the data structures and methods described below for unique object identification and methods of determining the unique identifier of objects.

Figure 3:
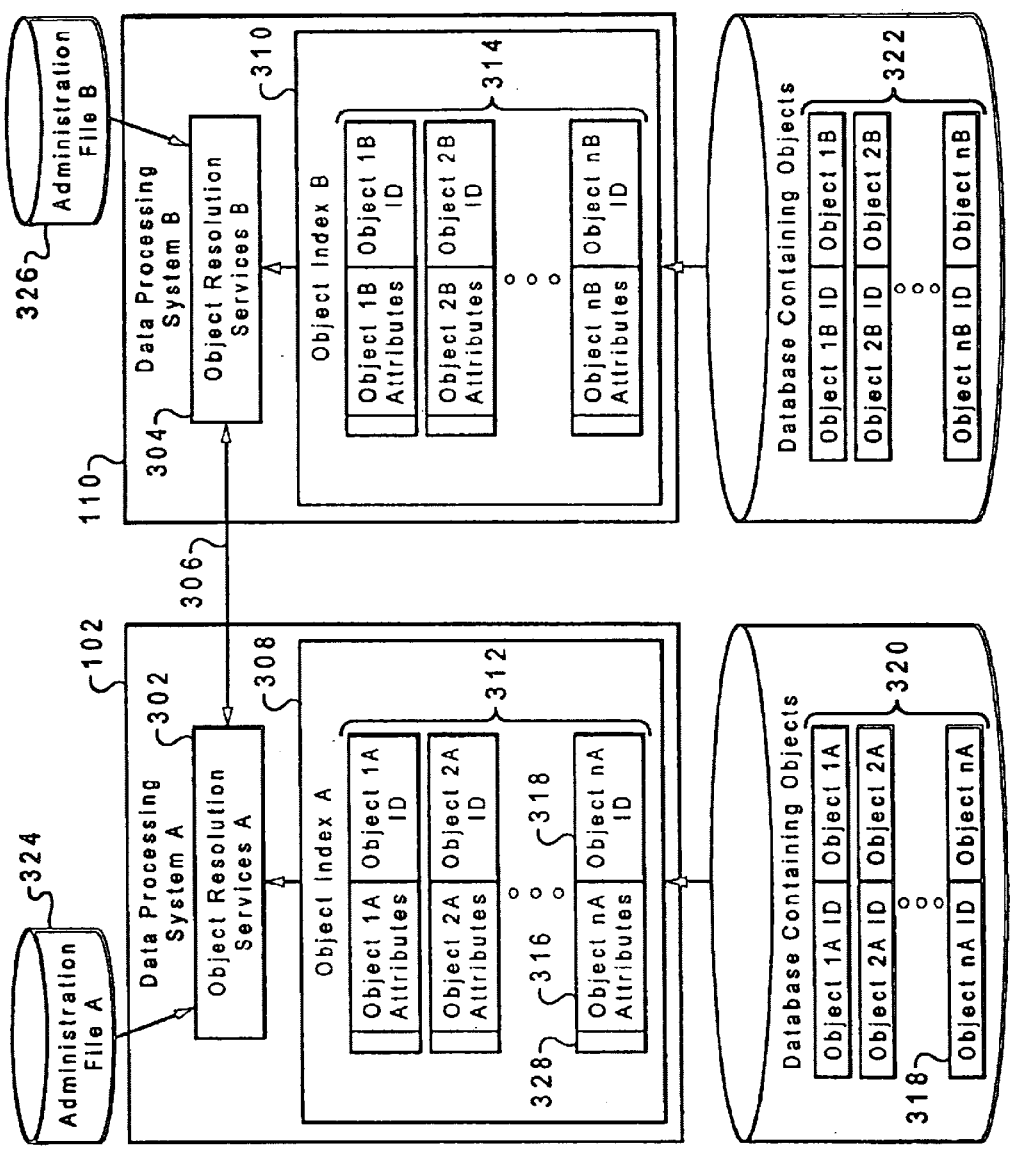
FIG. 3 depicts an implementation diagram for unique object identification and methods of determining the unique identifier of objects in a plurality of peer data processing systems in accordance with a preferred embodiment of the present invention.

With reference now to FIG. 3, an implementation diagram for unique object identification and methods of determining the unique identifier of objects in a plurality of peer data processing systems in accordance with a preferred embodiment of the present invention is depicted. The exemplary environment depicted includes two data processing systems 102 and 110. Each data processing system includes logic for object resolution: data processing system 102 includes object resolution services 302, while data processing system 110 includes object resolution services 304. Object resolution services 302 and 304 are connected by and may communicated via a communications link 306.

Each data processing system also includes an object index: data processing system 102 includes object index 308, while data processing system 110 includes object index 310. Each object index 308 and 310 contains a group of object attribute records (OARs) 312 and 314, respectively, for objects within the corresponding data processing system 102 and 110. Each object attribute record includes a plurality of object attributes 316 and an object identifier 318, which are discussed in further detail below, and a flag 328 indicating whether the object attribute record is a master object attribute record or a copy. Object attribute records 312 and 314 are utilized by the respective object resolution services 302 and 304 to retrieve objects from corresponding database object groups 320 and 322 where the objects are stored. Although the databases containing object groups 320 and 322 are depicted as external to respective data processing systems 102 and 110, those skilled in the art will recognize that such databases may also be implemented within the data processing systems. Associated with each object attribute record and each object in a database is a corresponding object identifier 318 which is unique for each object across data processing systems 102 and 110.

Data processing systems 102 and 110 have a peer-to-peer relationship rather than a client-server relationship, as do object resolution service 302 and 304. Object resolution services 302 and 304 are considered peers since neither has any dependency on any other data processing system or object resolution service for resolving object identifiers for objects contained within or otherwise accessible to their respective data processing systems 102 and 110. Each object resolution services module 302 and 304 also has access to a corresponding administration file 324 and 326, respectively, which contains system operation information provided by a system administrator, such as the location definitions for other object resolution services located in other data processing systems in a network of data processing systems. As with the databases containing objects, those skilled in the art will recognize that administration files 324 and 326 may be implemented within the respective data processing systems 102 and 110 although depicted in the exemplary embodiment as external to data processing systems 102 and 110.

The structure and operation of the components depicted in FIG. 3 will be described in greater detail below. It is noteworthy that although the exemplary embodiment employs only two data processing systems with respective object resolution services and contained within two date processing system networks for the purposes of describing and illustrating the invention, the mechanism of the present invention scales for implementation with any number of data processing system networks, each containing an arbitrary number of data processing systems having respective object resolution services.

Figures 4, 5B:
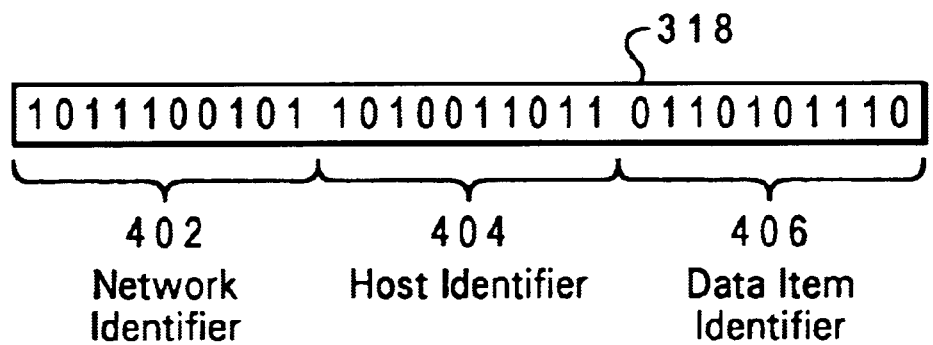

Referring to FIG. 4, an object identifier for uniquely identifying object within a plurality of data processing system networks in accordance with a preferred embodiment of the present invention is illustrated. Object identifier 318 in accordance with the present invention may be generated for each new object within a particular data processing system with a value which is unique across all networks including data processing systems, and across all data processing systems in such networks, containing objects accessed through a respective object resolution services. Furthermore, object identifier 318 may be generated without the host data processing system being in communications with any other data processing system at the time of generation.

Object identifier 318 contains a value including a plurality of fields 402, 404, and 406. Although a binary numeric value is shown for the purposes of illustrating the invention, the value may be any numeric or alphanumeric value in any format, including decimal hexadecimal, etc. Each object identifier 318 is constructed from three fields 402, 404, and 406, with the combination of values for each field constituting a unique value for a specific object within a particular data processing system within an individual network within a system of networks. The high order field 402 within object identifier 318 contains a unique value for the network within the overall system of networks within which the identified object is contained. Similarly, the next ordered field 404 contains a unique value for the data processing system within the network in which the identified object is contained. The low order field 406 contains a unique value for the object within the host data processing system in which the identified object may be found.

Object field 406 is unique for each object contained within a particular data processing system, although different data processing systems may contain different objects having equivalent object fields. Similarly, host system field 404 is unique for each data processing system in a given network, although two networks may each contain a data processing system having the same host system field 404. Network field 402 is unique for each network with the system of networks across which objects must be uniquely identified. Therefore, the combination of values contained within the three fields 402, 404, and 406 for a particular object identifier 318 uniquely identifies a single object within a single host data processing system within a single network in the system of networks.

Administrative procedures may be implemented to specify unique values for each network in the system of networks, unique values for each data processing system in a given network, and unique values for each object within a data processing system. The contents of these fields 402, 404, and 406 may be made unique by incrementing a number as each new object is created and/or instantiated within a particular data processing system, as each new data processing system is added to a specific network, and as each new network is connected to the overall system of networks. A central registry may be maintained within each data processing system for objects and object identifiers within that system, within each network for data processing system identifiers in that network, and within the system of networks for each network within the system. Each data processing system in the system of networks has access to its own unique values through specification of such values in a configuration data base. An important feature of the present invention is that the unique object identifier for a particular object in a specific data processing system persists even after changes to the network or system of networks in which the object is contained.

With reference now to FIGS. 5A, 5B, 5C, 5D, and 5E, an attribute specification table, an input criteria table, and high level flowcharts for a process of determining a unique object identifier through analysis of object attributes in accordance with a preferred embodiment of the present invention is depicted. Objects stored in databases accessible to a particular data processing system are assigned a unique object identifier to distinguish them from all other objects. This object identifier may be generated from multiple fields as described above or assigned from an external source. The attributes of the object, or at least a subset of all of the attributes, are associated with the object identifier and stored in an object index, with each corresponding object attributes/object identifier pair forming an object attribute record as described earlier. The object identifier is also stored in the database containing the identified object, in association with that object. Generally, the object identifier serves as a "key" to manifest or retrieve a desired object. In many cases, however, the object must be located even though the object identifier is not known.

Suppose that the objects of interest identify a person who is a bank customer or a health care plan subscriber. When the person first becomes a customer or subscriber, an object is created to store information about that person, the information is entered, the object is assigned a unique identifier, and the object is written to the database accessible to the host data processing system. The attributes or properties of the newly created object reflect information about the person, and certain attributes are extracted to create an object attribute record. The attributes extracted are those which will permit, alone or in combination, accurate identification of the object and the corresponding unique object identifier. Thus, an object attribute record may contain, for example, the person's last name, first name, middle initial, social security number, home address, gender, race, driver's license number and state, date of birth, etc. The unique object identifier for the object is contained within the object attribute record in association with these attributes. If access to the object is required but the object identifier is not known, the attributes in the object attribute record may be utilized to determine the object identifier so that the object may be retrieved from the database.

Attribute specification table 502 depicted in FIG. 5A is employed in the process of determining an object identifier from attributes and includes attribute names 504, various weights 506, 508, and 510, and a rule 512 to be called in case of a no-match. The names and values are supplied by a systems administrator in the table and are used for execution of object resolution. Attribute name 504 is the name of an object attribute contained within the object attribute records (e.g., last name). Match weight 506 is a value representing the worth of an attribute if the attribute value contained in an individual object attribute record matches the attribute value supplied in the object resolution criteria. This allows different weights to be assigned for evaluation of the probability of a correct match. For example, if the attribute is a person's social security number, the match weight may be 90, while if the attribute is the person's first name, the match weight may be 10 or less. Similarly, non-match weight 508 is a value representing the worth of an attribute if the attribute value was supplied as part of the object resolution input criteria but did not match the attribute value contained in an individual object attribute record being analyzed. Non-matching weight 508 may have a negative value and therefore may be utilized to diminish the affect of another attribute value in the same object attribute record matching a corresponding attribute value specified in the input criteria. For example, the match weight for a person's last name attribute may be 60 but the non-match weight for the persons social security number attribute may be –50. A match in the person's last name may therefore be offset by a discrepancy between the social security number in the object attribute record and that supplied in the input criteria.

Post-rule weight 510 is a value representing the worth of an attribute if no exact match was found, a named rule was executed, and a subsequent match was found. Rule name 512 is the name of a rule, an executable method, to be executed if no match is initially found between the input criteria attribute value and an object attribute record attribute value. For example, if the input criteria attribute was LAST NAME=O'Connell and no match were identified, a rule named "SQUISH" may be executed on the input criteria to compact the input criteria attribute value to LAST NAME= OConnell. If the result of a subsequent comparison between the input criteria value and the object attribute record value was a match, the value of post-rule weight 510 would be the value employed in subsequent calculations. As is apparent from the above discussion, not all attributes will necessarily have associated rules 512 and post-rule weights 510.

Input criteria for the process of determining an object identifier through object attribute analysis may consists of single attributes or combinations of attributes. However, certain combinations of input criteria are, taken alone, insufficient to successfully resolve the object attributes for determination of a specific object attribute identifier. For example, input criteria such as date of birth and gender alone would not likely be sufficient to resolve the attributes to the particular person desired. Therefore, a systems administrator may specify sets of input criteria required for object attribute resolution, stopping object attribute resolution before it starts if at least one set of attributes are not supplied as input criteria.

Input criteria table 514 depicted in FIG. 5B contains information supplied by a systems administrator. Each input criteria set in the depicted example includes a combination name 516, which is a name for a given set of attributes, and an attribute name list 518, which is a list of attribute names for which values are required as input criteria before the object attribute resolution process will proceed on the basis of the attribute set. For example, a first attribute set may have a combination name 516 of RCOMBO1 and a corresponding list 518 of attribute names including LAST NAME, SOCIAL SECURITY NUMBER, and DATE OF BIRTH. Similarly, a second attribute set may have a combination name 516 of RCOMBO2 and a corresponding attribute name list 518 of including LAST NAME, DRIVER'S LICENSE NUMBER and DRIVER'S LICENSE STATE. Each attribute name designation in a given attribute list 518 must also be specified in attribute specification table 502. The number of attribute names in a given attribute set may be one or more than one, depending on whether the system administrator believes a single particular attribute is sufficient of object attribute resolution or whether additional attributes are believed to be required. By specifying combinations, the system administrator defines the minimum sets of input criteria necessary to perform object attribute resolution within a particular data processing system and/or network.

The list of attribute names 518 for a given attribute set 516 are ANDed together when checking for adequacy of input criteria. The input criteria furnished may include more attributes than are required to satisfy a particular combination 516, and may contain sufficient attributes to satisfy more than one set. All that is required is that at least enough attributes be specified to satisfy the list 518 corresponding to at least one combination 516 for object attribute resolution to proceed. The object attribute resolution services logic ORs the combinations, proceeding if the attributes specified in the list 518 for any one combination 516 are satisfied and rejecting resolution requests only if no combination 516 is satisfied. Combinations 516 are employed for performance reasons, to insure that sufficient primary attributes exist for matching and that the possibility of a sum of "weak" attribute weights does not result in a match in the absence of sufficient important attributes. Resolution requests containing insufficient information to reliably perform resolution matching are rejected under these input criteria combination thresholds.

Figure 5C:
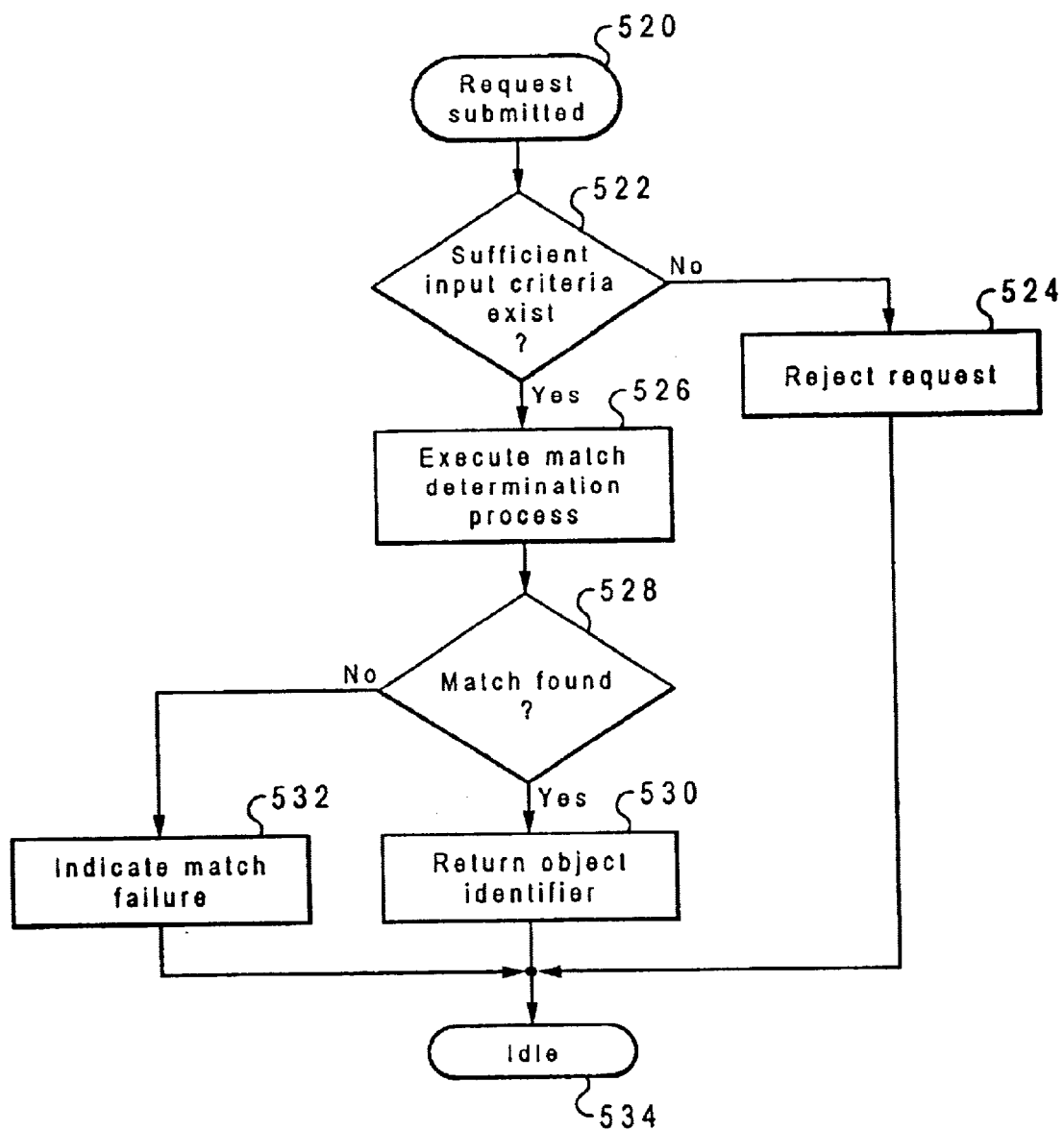

FIG. 5C depicts a high level flowchart for a general process of object attribute resolution in accordance with a preferred embodiment of the present invention. The process begins at step 520, which depicts receiving an object attribute resolution request and accompanying input criteria for an attempted object attribute resolution with object attribute records within an object index in a host data processing system. The process then passes to step 522, which illustrates a determination of whether sufficient input criteria exist in the request to satisfy at least one combination specified in the input criteria table for reliable object attribute resolution. If not, the process proceeds to step 524, which depicts rejecting the request. If so, however, the process proceeds instead to step 526, which illustrates execution of the match determination process, and then to step 528, which depicts a determination of whether a match was found within the object index being searched.

If a match is located within the object index maintained in the host data processing system, the process proceeds to step 530, which depicts returning the unique object identifier associated with the matching object attribute record within the object index. Otherwise, the process proceeds instead to step 532, which illustrates returning an indication of the match failure. From any of steps 524, 530, or 532, the process passes to step 534, which illustrates the process becoming idle until another object attribute resolution request is again received.

Figure 5D:
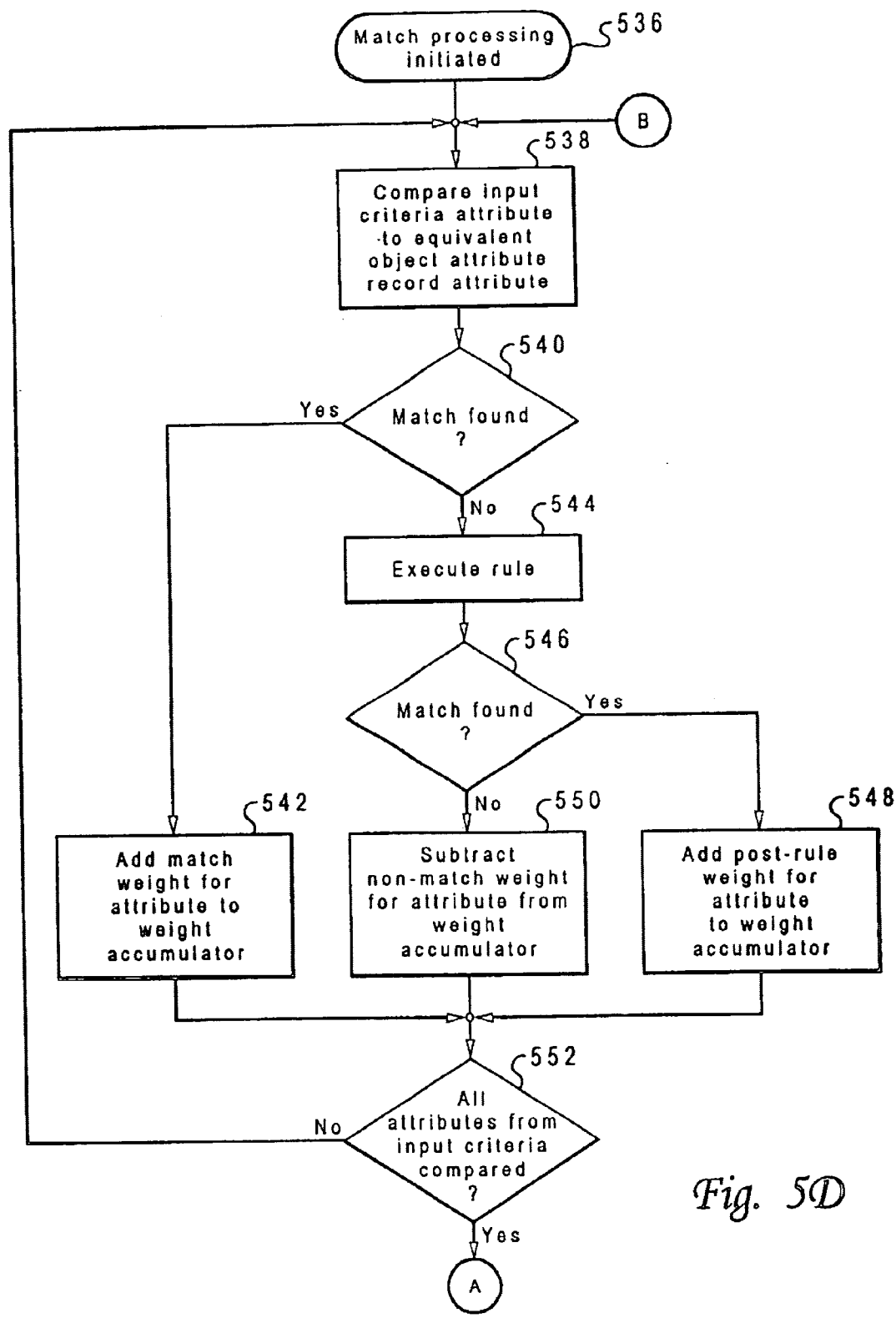
Figure 5E:
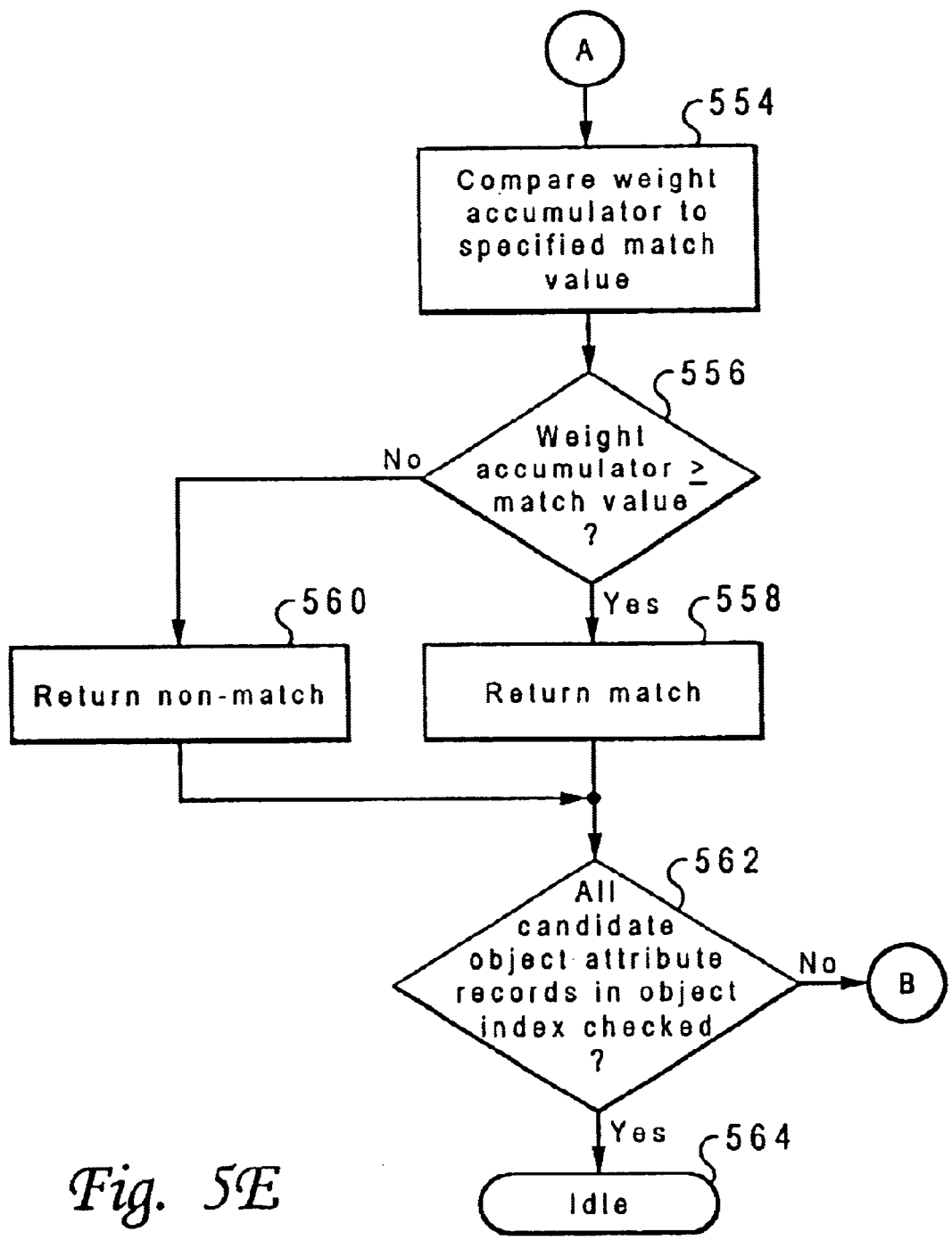

FIGS. 5D and 5E depicts a process for match determination utilizing an attribute specification table in accordance with a preferred embodiment of the present invention. This process may be performed for the match determination process depicted as step 526 is FIG. 5C. The process begins at step 536 depicted in FIG. 5D, which illustrates initiation of the match determination process, and then passes to step 538, which depicts comparison of an input criteria attribute value to a corresponding object attribute record attribute value.

The process next passes to step 540, which illustrates a determination of whether the input criteria attribute value matches the equivalent object attribute record attribute value. If so, the process proceeds to step 542, which depicts adding the match weight for the attribute under consideration in the attribute specification table to a "weight accumulator." If not, however, the process proceeds instead to step 544, which illustrates executing any rule which may be associated with the attribute under consideration in the attribute specification table. The process next passes to step 546, which depicts a determination of whether the input criteria attribute value now matches the corresponding object attribute record attribute value. If so, the process proceeds to step 548, which illustrates adding the post-rule weight for the attribute under scrutiny in the attribute specification table to the weight accumulator. If not, however, the process proceeds instead to step 550, which depicts subtracting the non-match weight from the weight accumulator.

The above-described process for determining whether a desired object attribute record has been found calculates a match value from the sum of the weights of matched input criteria (either matched weights or post-rule weights) minus the sum of non-match weights for unmatched input criteria. Thus, the input criteria version is compared to the object attribute record version of the subject attribute. If no match occurs, a rule is executed if available and the result compared to the object attribute record version of the subject attribute. If no match occurs and no rule is specified, or if a rule is specified and executed but no match occurs in any case, the non-match weight is subtracted from the weight accumulator.

From any of step 542, 548, or 550, the process passes to step 552, which depicts a determination of whether all attributes from the input criteria have been tested against the corresponding attributes in the subject object attribute record. If not, the process returns to step 538 to compare a new input criteria to a corresponding attribute in the object attribute record, and continues reiterating steps 538 through 552 until all input criteria have been tested. Once all input criteria have been tested against the object attribute record under consideration, the process proceeds to step 554 depicted in FIG. 5E, which illustrates comparing the value in the weight accumulator to a specified match value.

The system administrator specifies a match value (e.g., OBJECT_MATCH) for determining when a match has occurred between input criteria submitted with a request and an object attribute record within the object index of a host data processing system. This match value would be a global parameter for determining whether resolution—an object match—has been achieved after the input criteria have been processed against the object attribute record from the object index utilizing the weights specified in the attribute specification table. The calculated sum value of weights (matched and post-rule minus non-matched) for the comparison of input criteria to an object attribute record is compared to this value specified by the system administrator. If the calculated value is equal to of greater than the administrator specified value, a match has occurred.

From step 554, the process passes to step 556, which depicts a determination of whether the weight accumulator equals or exceeds the specified match value. If so, the process proceeds to step 558, which illustrates returning a match. If not, however, the process proceeds instead to step 560, which depicts returning a non-match for the object attribute record under consideration. From either of steps 558 or 560, the process then passed to step 562, which illustrates a determination of whether the input criteria have been tested against all object attribute records in the object index. If not, the process returns again to step 538 depicted in FIG. 5D and reiterates steps 538 through 562 until all candidate object attribute records within the object index have been tested. When the entire object index has been checked, the process then proceeds to step 564, which illustrates the process becoming idle until the match determination process is once again initiated.

Figure 6A:
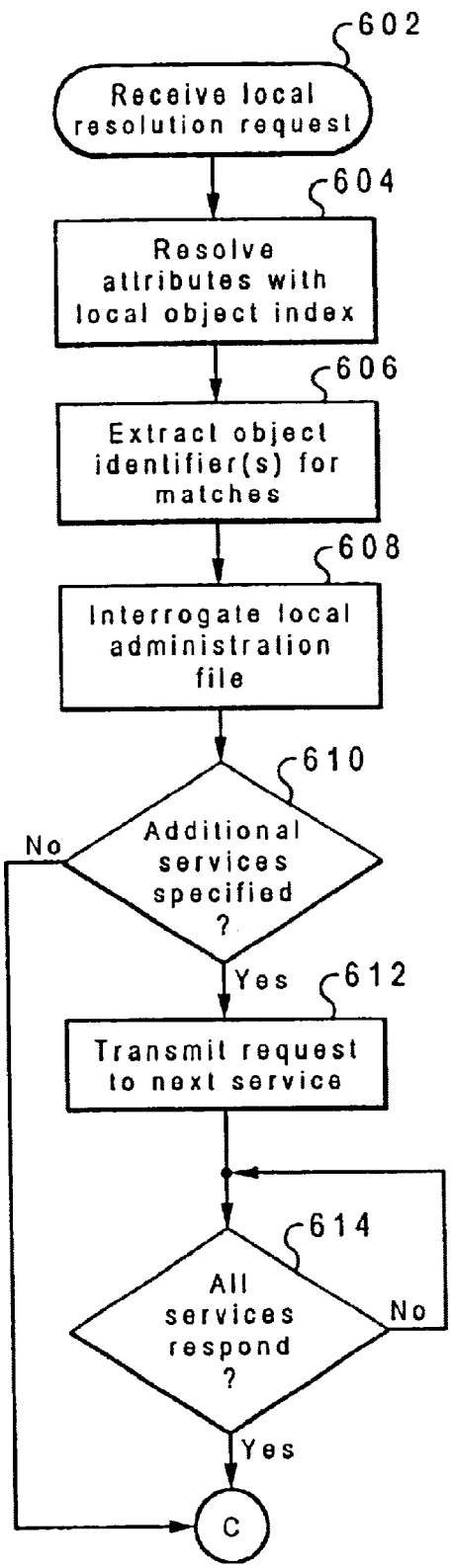
FIGS. 6A–6D are high level flowcharts for a process of resolving an object identifier from object attributes and/or modification of an object attribute record within a plurality of peer data processing systems in accordance with a preferred embodiment of the present invention.
Figure 6B:
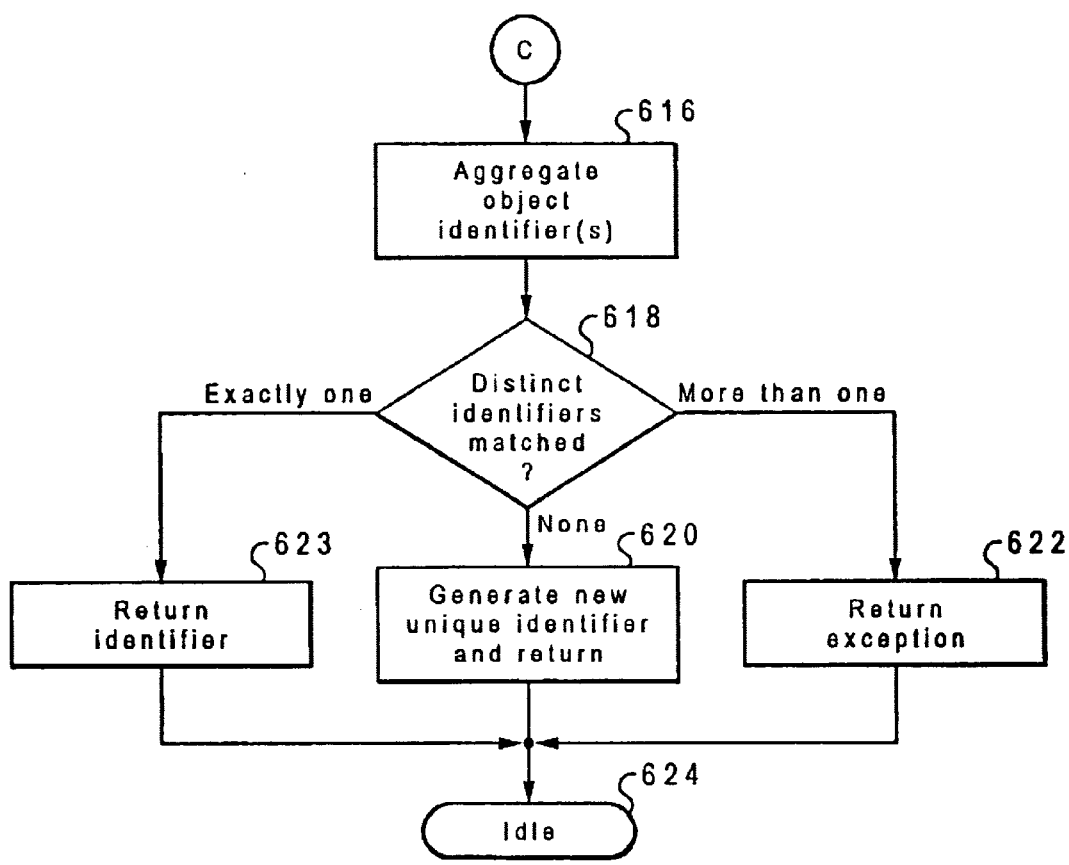

Referring to FIGS. 6A, 6B, 6C, and 6D, high level flowcharts for a process of resolving an object identifier from object attributes and/or modification of an object attribute record within a plurality of peer data processing systems in accordance with a preferred embodiment of the present invention are illustrated. FIGS. 6A and 6B illustrate a process for resolving object attributes to determine an object identifier where a request originates from a local application in a plurality of peer data processing systems each having local object resolution services. An application located, for example, in data processing system 102 depicted in FIGS. 1 and 3 provides attributes for an object attribute resolution by object resolution services 302 depicted in FIG. 3. The application requests that object resolution services 302 return the unique object identifier associated with the supplied attributes, perhaps for the purposes of retrieving and modifying the identified object. An example of the attributes supplied by the requesting application may be the last name, first name, social security number, and date of birth of a person.

The process begins at step 602 shown in FIG. 6A, which illustrates receiving the local resolution request, and then passes to step 604 which depicts resolving the attributes against the local object index to determine of any object attribute records in the local object index are a match for the specified attributes. The structures and processes depicted in FIGS. 5A–5D and described above may be employed for this purpose. The process next passes to step 606, which depicts extracting the associated object identifier or identifiers for each object attribute record determined to comprise a match with the application supplied attributes under the system administrator defined match value. It is possible that one match will be found, no matches will be found, or multiple matches will be found for the supplied attributes under the current specified match value. Since each object attribute record within an object index is supposed to be sufficiently unique to permit resolution based on defined combinations of attribute values, finding multiple matching object attribute records is considered an exception condition requiring, for instance, that a user be prompted to supply additional attributes via the requesting application. A log of such occurrences may be maintained to allow the system administrator to adjust the weights in the attribute specification table, the combinations in the input criteria table, and/or the specified match value.

Once processing of the local object index has completed, the process proceeds to step 608, which illustrates interrogation of the local administration file (administration file 324 depicted in FIG. 3 for the present example). The interrogation determines whether other object resolution services are specified with which the local object resolution services 302 should communicate regarding the effort to match attributes supplied by the requesting application. The system administrator will have previously inserted into the administration file information indicating that the local object resolution services 302 should propagate the request to other object resolution services, such as object resolutions services 304 within data processing system 110, as depicted in FIG. 3. This information may take the form, for example, of:

SEARCH_LIST=ORS_B where ORS_B is the symbolic name for the next object resolution service 304 to which the search request is to be propagated.

The process thus passes to step 610, which depicts a determination of whether the search request should be propagated to additional object resolution services. If so, the process proceeds to step 612, which illustrates transmitting the request to the next specified service. The request will be for object resolution services 304 to determine if the attributes supplied by the requesting application match any object attribute record within object index 310 in data processing system 110. Included in the transmission to the next object resolution service are the identities of the services which have already been processed. The purpose of such identification is to prevent a loop-back condition from occurring. Consider, for instance, three object resolution services, ORS_A, ORS_B, and ORS_C, in which the respective administration files contain the following information:

In administration file A: SEARCH_LIST=ORS_B, ORS_C;

In administration file B: SEARCH_LIST=ORS_A, ORS_C;

In administration file C: SEARCH_LIST=ORS_A, ORS_B.

In the above example, a search originating with an application local to ORS_A will loop-back to ORS_A after ORS_B completes its matching determination and interrogates its local administration file, administration file B. Upon searching administration file B to determine where to next forward the search, ORS_B could return the search back to ORS_A. With the previous object resolution services searched identified in the transmitted request, however, a receiving object resolution services such as ORS_B will not propagate the request back to any object resolution services which have been previously engaged in the search.

Referring again to FIG. 6A, the process next passes to step 614, which depicts a determination of whether responses have been received from all object resolution services identified in the local administration file. Upon receipt of responses from all specified object resolution services, the process proceeds to step 616 shown in FIG. 6B, which illustrates aggregating the object identifier(s) for all matching object attribute records. This includes those identified from analysis of the local object index as well as those returned from remote object resolution services. The process next passes to step 618, which depicts a determination of whether distinct object identifiers have been found. Copies of local object attribute records may be maintained in remote data processing systems, but should include the same object identifier as contained in a local object index. If no distinct object identifiers were located, the process proceeds to step 620, which illustrates returning the object identifier to the requesting application. If no object identifier is found, a unique object identifier is generated as described above and returned. If more than one (distinct) object identifier was found, however, the process proceeds instead to step 622, which depicts returning an exception condition. From either of step 620 or 622, the process passes to step 624, which illustrates the process becoming idle until an application again initiates a request.

Figure 6C:
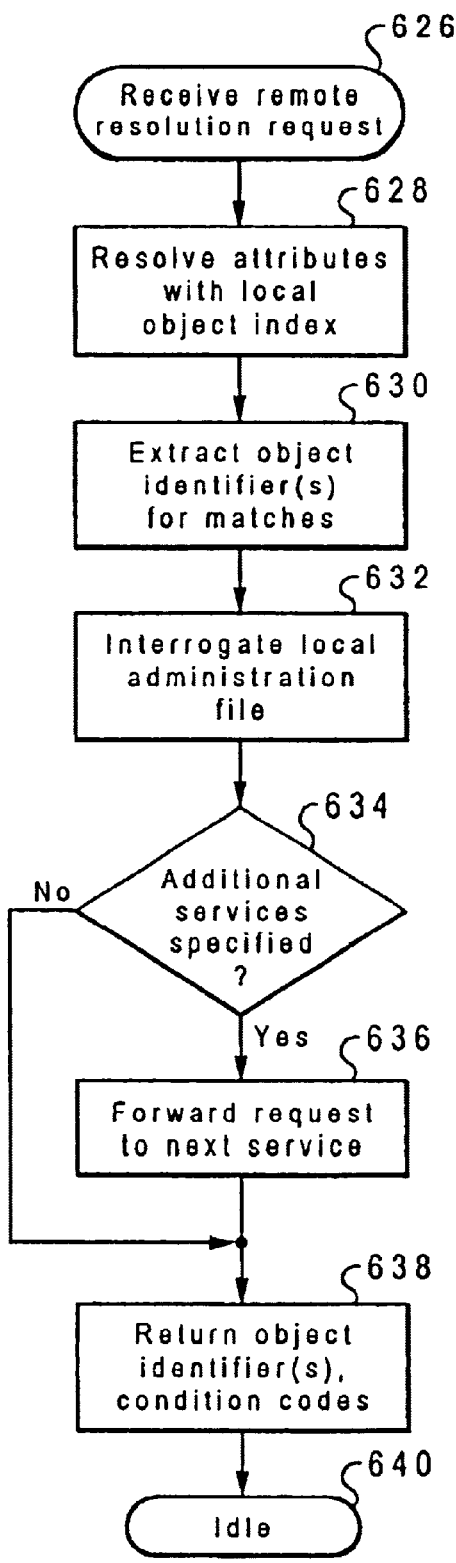

FIG. 6C illustrates a process employed when a resolution request originates with remote object resolution services, such as might be performed in object resolution services 304 (ORS_B) upon receiving a search request propagated from object resolution services 302 (ORS_A) as earlier described. Upon receiving the request, the same determination process is employed within object resolution services 304 as was employed in object resolution services 302. The process thus begins at step 626, which depicts receiving the remote resolution request, and then passes to step 628, which illustrates resolving the supplied attributes against object attribute records within local object index 310. The process next passes to step 630, which depicts extracting the object identifier(s) for matching object attribute records, and then to step 632, which illustrates interrogating the local administration file to determine if other services should be forwarded the search request. The information specified in the local administration file is compared to the object resolution searches which the transmitted request indicates have already been queried.

The process then passes to step 634, which illustrates a determination of whether additional object resolution services should be contacted with the search. If so, the process proceeds to step 636, which depicts forwarding the request to the next service, together with an identification of all object resolution services queried thus far (including ORS_B 310), and then to step 638. If no object resolution services remain to be contacted, however, the process proceeds instead directly from step 634 to step 638, which illustrates returning object identifier(s) for any matching object attribute records and condition codes to the originating object resolution services (ORS_A 304). The condition codes may indicate to the originating object resolution services that: (1) no matches were found; (2) one match was found; or (3) multiple matches were found. Additional condition code values may be provided to further described matching factors. The process then passes to step 640, which illustrates the process becoming idle until another resolution request is received from remote object resolution services. As described above in connection with FIG. 6B, the originating object resolution services accepts the object identifier(s) from remote object resolution services, aggregates them, and returns an object identifier or an exception condition to the requesting application.

Figure 6D:
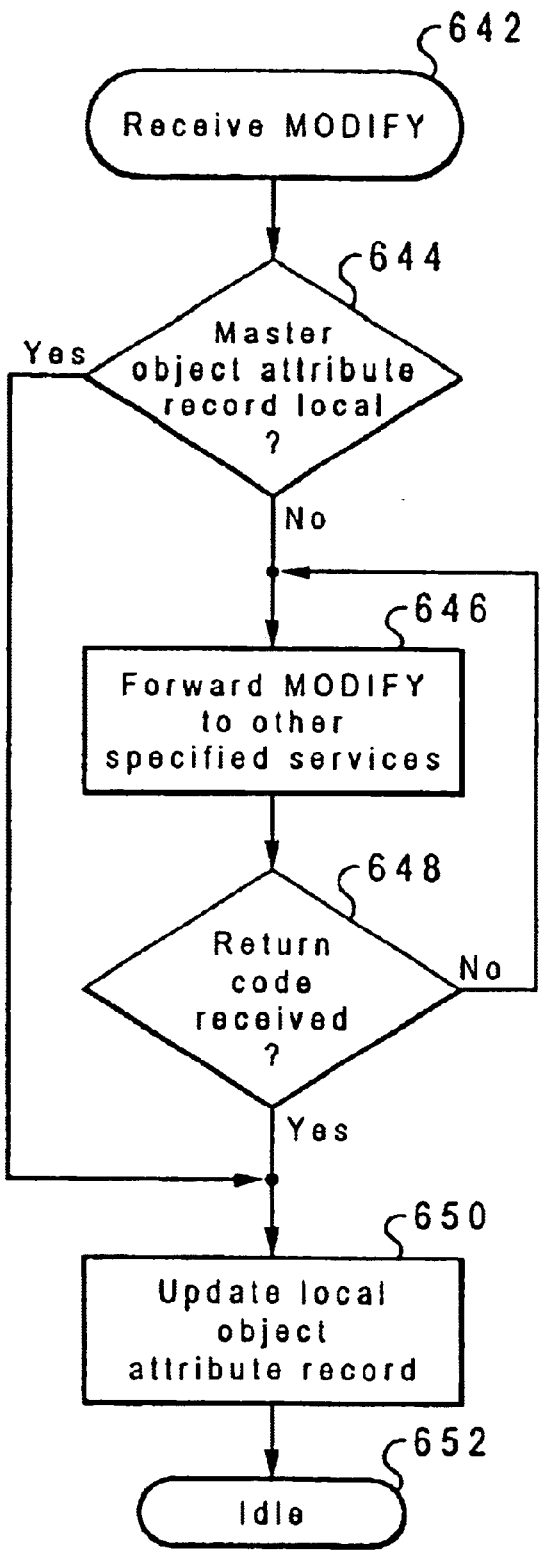

A natural objective in a network of data processing systems for locating an object identifier is to retrieve the identified object for modification, which may also require modification of the associated object attribute record. FIG. 6D illustrates a process of modifying an object attribute record in accordance with a preferred embodiment of the present invention. As previously noted, copies of object attribute records may be maintained in data processing systems which are remote from the host data processing system containing the identified object. The object attribute record within the data processing system containing the identified object may be considered the "master" or "base" object attribute record, while equivalent object attribute records in other data processing systems may be regarded as mere copies. Modification of the attributes of in an object attribute record must be made in the master or base object attribute record, which may require first locating this master or base record within a network of data processing systems.

The exemplary process begins at step 642, which depicts receiving a MODIFY command, with a unique object identifier and the attributes to be modified, from a local application. The process then passes to step 644, which illustrates a determination of whether the master object attribute record is maintained in a local object index. Using the object identifier, the object resolution services may check the state of a flag associated with the object attribute record associated with the specified object identifier.

If the master object attribute record is not maintained locally, the process proceeds to step 646, which depicts forwarding the MODIFY command and its arguments to another object resolution service specified in its local administration file (SEARCH_LIST). The process then proceeds to step 648, which depicts a determination of whether a return code is received from remote object resolution services indicating that it maintains—and will appropriately modify—the master object attribute record. If such a code is not received, the process returns to step 646 to continue propagating the MODIFY command and arguments to other specified object resolution services. Once a return code is received, however the process proceeds instead to step 650.

Referring back to step 644, if the master object attribute record is maintained locally, the process proceeds instead directly to step 650, which illustrates updating the local object attribute record. In the case where the master object attribute record is not local, this step may be condition on the existence of an object attribute record (copy) corresponding to the specified object identifier in the local object index. The process then passes to step 652, which depicts the process becoming idle until again invoked by receiving a MODIFY command from an application.

It is important to note that while the present invention has been described in the context of a fully functional data processing system, network, and/or system of networks, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of uniquely identifying an object, comprising:

associating a unique host identifier with a data processing system within a plurality of data processing systems;

associating a unique data item identifier with an object within a plurality of objects within the data processing system;

associating a unique network identifier with a network of data processing systems within a plurality of networks of data processing systems, wherein the network includes the data processing system containing the object; and constructing a unique object identifier for the object by combining a plurality of fields including a first field containing the data item identifiers, a second field containing the host system identifier and a third field containing the network identifier.

2. The method of claim 1, wherein the step of associating a unique host identifier with a data processing system further comprises:

associating different host identifiers with each data processing system within the plurality of data processing systems.

3. The method of claim 1, wherein the step of associating a unique data item identifier with an object within the data processing system further comprises:

associating different data item identifiers with each object within the plurality of objects.

4. The method of claim 1, further comprising:

assigning a different host identifier to each data processing system added to the plurality of data processing systems.

5. The method of claim 1, further comprising:

assigning a different network identifier to each network of data processing systems added to the plurality of networks.

6. An apparatus for uniquely identifying an object, comprising:

a plurality of networks of data processing systems, a network within a plurality of networks being associated with a unique network identifier;

a data processing system within a plurality of data processing systems within the network, the data processing system being associated with a unique host identifier;

an object within a plurality of objects within the data processing system, the object being associated with a unique data item identifier; and a unique object identifier associated with the object, the unique object identifier constructed by combining a plurality of fields including a first field containing the data item identifier, a second field containing the host system identifier, and a third field containing the network identifier.

7. The apparatus of claim 6, further comprising:

different host identifiers associated with each data processing system within the plurality of data processing systems.

8. The apparatus of claim 6, further comprising:

different data item identifiers associated with each object within the plurality of objects.

9. The apparatus of claim 6, further comprising:

different object identifiers for each object within each data processing system, each object identifier for an object constructed by combining:

a first field containing a data item identifier associated with the object which differs from any other data item identifier associated with any other object in a data processing system containing the object;

a second field containing a host identifier associated with the data processing system containing the object, the host identifier differing from any other host identifier associated with any other data processing system within the plurality of data processing systems.

10. The apparatus of claim 6, further comprising:

an object index within each data processing system, the object index containing object attribute records and object identifiers associated with objects within a data processing system containing the object index.

11. The apparatus of claim 6, further comprising:

a database within each data processing system, the database containing objects and object identifiers associated with objects within a data processing system containing the database.

12. A computer program product within a computer usable medium, comprising:

instructions within the computer usable medium for associating a unique network identifier with a network within a plurality of networks of data processing systems;

instructions within the computer usable medium for associating a unique host identifier with a data processing system within a plurality of data processing systems within the network;

instructions within the computer usable medium for associating a unique data item identifier with an object within a plurality of objects within the data processing system; and instructions within the computer usable medium for constructing a unique object identifier for the object by combining a plurality of fields including a first field containing the data item identifier, a second field containing the host system identifier, and a third field containing the network identifier.

13. The computer program product of claim 12, wherein the instructions for associating a unique host identifier with a data processing system further comprises:

instructions for associating different host identifiers with each data processing system within the plurality of data processing systems.

14. The computer program product of claim 12, wherein the instructions for associating a unique data item identifier with an object within the data processing system further comprise:

instructions for associating different data item identifiers with each object within the plurality of objects.

* * * * *